US009240122B2

(12) United States Patent
Kim

(10) Patent No.: US 9,240,122 B2
(45) Date of Patent: Jan. 19, 2016

(54) METHOD AND APPARATUS FOR CONTROLLING AUTOMATIC INTERWORKING OF MULTIPLE DEVICES

(71) Applicant: MTEK C&K CO., LTD., Incheon (KR)

(72) Inventor: Jong-Yong Kim, Incheon (KR)

(73) Assignee: MTEK C&K CO., LTD., Incheon (KR)

( * ) Notice: Subject to any disclaimer, the term of this patent is extended or adjusted under 35 U.S.C. 154(b) by 179 days.

(21) Appl. No.: 14/126,191

(22) PCT Filed: Dec. 21, 2012

(86) PCT No.: PCT/KR2012/011244
§ 371 (c)(1),
(2) Date: Dec. 13, 2013

(87) PCT Pub. No.: WO2013/133513
PCT Pub. Date: Sep. 12, 2013

(65) Prior Publication Data

US 2014/0111316 A1 Apr. 24, 2014

(30) Foreign Application Priority Data

Mar. 5, 2012 (KR) ........................ 10-2012-0022250
Sep. 24, 2012 (KR) ........................ 10-2012-0106146

(51) Int. Cl.
*G05B 11/01* (2006.01)
*G08B 5/22* (2006.01)
(Continued)

(52) U.S. Cl.
CPC ................ *G08C 17/02* (2013.01); *G08C 17/00* (2013.01); *G08C 2201/33* (2013.01); *G08C 2201/50* (2013.01)

(58) Field of Classification Search
CPC ........... G08C 2201/33; G08C 2201/50; G08C 2201/92; G08C 2201/51; G08C 2201/20; G08C 17/00; G08C 2201/41; H04L 12/2805; H04L 12/282
USPC ......... 340/12.5, 12.22, 12.23, 4.3, 8.1, 12.54, 340/539.32; 710/110; 345/660, 173; 348/734, E05.096
See application file for complete search history.

(56) References Cited

U.S. PATENT DOCUMENTS 7,450,148 B2 11/2008 Kim et al.
7,774,527 B2 8/2010 Kim et al.
(Continued)

FOREIGN PATENT DOCUMENTS

KR 10-2004-0082819 A 9/2004
KR 10-2005-0099300 A 10/2005
(Continued)

OTHER PUBLICATIONS

Patent Cooperation Treaty, International Search Report, International Patent Application No. PCT/KR2012/011244, Apr. 10, 2013, 5 Pages (with English translation).

*Primary Examiner* — Mirza Alam
(74) *Attorney, Agent, or Firm* — Rabin & Berdo, P.C.

(57) ABSTRACT

Provided is a method for controlling multiple devices in an automatic interworking manner, by which the multiple devices are controlled, according to a set of operation mstoringodes including combined functions of the multiple devices, through one central control device without individually controlling the functions of each of the multiple devices. The method includes an operation mode setting step for setting an operation mode in which performable functions of the electronic devices are combined and performed in a specific order and for storing the set operation mode in the central control device, an operation mode selecting step for selecting an operation mode to be executed in a plurality of set operation modes, and a controlling step for controlling the electronic devices according to the selected operation mode.

6 Claims, 8 Drawing Sheets

(51) Int. Cl.

| | |
|---|---|
| ***G06F 13/00*** | (2006.01) |
| ***H04N 5/765*** | (2006.01) |
| ***G08C 17/02*** | (2006.01) |
| ***G08C 17/00*** | (2006.01) |

(56) References Cited

U.S. PATENT DOCUMENTS

| | | | | |
|---|---|---|---|---|
| 7,853,732 | B2 | 12/2010 | Kim et al. | |
| 8,214,863 | B2 | 7/2012 | Kim et al. | |
| 2005/0033887 | A1* | 2/2005 | Kim | G08C 17/00 710/110 |
| 2005/0034160 | A1* | 2/2005 | Kim | H04L 12/2805 725/80 |
| 2005/0065619 | A1 | 3/2005 | Kim et al. | |
| 2005/0102699 | A1 | 5/2005 | Kim et al. | |
| 2011/0074548 | A1* | 3/2011 | Miyazawa | 340/8.1 |
| 2011/0106279 | A1* | 5/2011 | Cho | G08C 17/02 700/90 |
| 2012/0146918 | A1* | 6/2012 | Kreiner et al. | 345/173 |
| 2012/0206492 | A1* | 8/2012 | Fukui | G06F 3/048 345/660 |
| 2013/0188960 | A1* | 7/2013 | Gao | G08C 23/04 398/106 |
| 2013/0322846 | A1* | 12/2013 | Ferren | G06K 9/3266 386/234 |

FOREIGN PATENT DOCUMENTS

| | | | |
|---|---|---|---|
| KR | 10-2006-0010073 | A | 2/2006 |
| KR | 10-0693224 | B1 | 3/2007 |
| KR | 10-2010-0047733 | A | 5/2010 |

* cited by examiner

METHOD AND APPARATUS FOR CONTROLLING AUTOMATIC INTERWORKING OF MULTIPLE DEVICES

TECHNICAL FIELD

The present invention relates to an automatic interoperation control method for multiple devices, and in particular to an automatic interoperation control method for multiple devices which makes it possible to easily control multiple electronic devices in accordance with a set operation mode by combining the functions of the multiple electronic devices with the aid of one central control unit, in more detail, which makes it possible to control multiple devices to interoperate with one operation mode command set by the central control unit.

BACKGROUND ART

Generally speaking, a remote controller is directed to controlling various electronic devices, by way of a wireless transmission of a frequency from a distant area, such as a television, a Digital Versatile Disc (DVD), a Videocassette Recorder (VCR), a cable broadcast, a Set Top Box (STB), an audio and other remote control devices. Each remote controller is designed to transmit an infrared ray signal in accordance with a control code which is differently set depending on the kinds of products of each manufacture company so as to distinguish a specific electronic device from other company's devices.

In case that a home uses different kinds of electronic devices, the home requires multiple remote controllers for the sake of different electronic devices, which makes it hard for a user to manage multiple remote controllers. When a user needs to purchase and use a new electronic device, the user has to change the remote controller, which makes the user feel troublesome.

In an attempt to improve the above mentioned problems, a universal remote controller has been developed and marketed, which controller makes it possible to control multiple electronic devices with one controller.

With the above mentioned universal remote controller, it became possible to control multiple electronic devices with one controller without controlling a certain electronic device with its own exclusive controller.

As an example of the above mentioned universal remote controller, as shown in FIGS. 1 and 2, there is the Korean Patent Registration No. 10-0693224 which has features in that in a zigbee network formed of an electronic device with a zigbee coordinator and another electronic device with a zigbee module, there are provided a key pad 21 for the sake of operations, a zigbee module 23 which communicates with the zigbee coordinator in accordance with a zigbee communication protocol and communicates with the zigbee module for thereby transmitting a control command to the side of a corresponding electronic device and receiving a result of the communication, a display unit 24 for displaying an operation state, and a controller 22 which communicates with the zigbee coordinator through the zigbee module 23 and receives and stores a binding cable and transmits a control command, through the zigbee module 23, with respect to a control target which is selected based on an operation of the key pad 21 and displays an operation state on the display unit 24.

The above described Korean Patent Registration No. 10-0693224 has problems in that one remote controller may control multiple electronic devices; however a user needs to directly push a button corresponding to an operation that a user wants to perform when it needs to control the operation of each device and then the user transmits a corresponding signal. When the user needs to perform multiple operations, the user has to directly transmit signals multiple times, which causes many troublesome.

DISCLOSURE OF INVENTION

Technical Problem

Accordingly, the present invention is made so as to improve the above mentioned problems encountered in the conventional art. It is an object of the present invention to provide an automatic interoperation control method for multiple electronic devices which has features in that there are provided a central control unit which transmits a control signal for controlling electronic devices and a plurality of electronic devices each equipped with a terminal control unit for receiving a signal from the central control unit. The user can sequentially control all the operations of the plurality of the electronic devices with the aid of one central control unit.

It is another object of the present invention to provide an automatic interoperation control method for multiple devices which has features in that a central control unit configured to control multiple electronic devices is equipped with a storing unit, and the storing unit stores an operation mode in which all functions or part of the functions performed by each electronic device are combined and conducted in a sequence that the user sets. When the user sets the operation mode performed by each device, the central control unit transmits the function, which is performed by each electronic device, to the terminal control unit installed at each electronic device in the set operation mode, and the multiple electronic devices automatically perform each function in accordance with the operation mode set by the user, so multiple electronic devices can be more easily controlled.

It is another object of the present invention to provide an automatic interoperation control method for multiple devices which has features in that it is possible to control a conventional electronic device using a central control unit by installing only a terminal control unit at a conventional electronic device, and when each control unit performs a function based on an operation mode, and each function is completed, a completion signal is transmitted to the central control unit, so it is possible to check the current states of each device using the central control unit.

Technical Solution

To achieve the above objects, there is provided an automatic interoperation control method for multiple devices performed with a plurality of electronic devices and a central control unit controlling the electronic devices, which method is characterized by an operation mode setting step in which to set an operation mode so that the functions performed by each electronic device are combined and performed in a certain sequence and to store the set operation modes in a central control unit; an operation mode selection step in which to select an operation mode which is performed in the set multiple operation modes; and a control step in which to control each electronic device in accordance with the selected operation mode.

Here, the control step is characterized in that a control signal is transmitted to a terminal control unit of each electronic device in accordance with a sequence of the operation mode selected by the central control unit.

The control step is characterized by comprising a control signal transmission step in which a control signal containing an exclusive code and a to-be-performed function of the electronic device is transmitted so as to perform a corresponding function in accordance with a sequence set in the operation mode selected by the central control unit; and a function performing step in which to analyze a control signal received from the terminal control unit of a corresponding electronic device and in which the electronic device performs a function contained in the control signal.

There is further provided a feedback step in which the terminal control unit transmits a function completion signal to the central control unit after the electronic device performs a corresponding function.

In addition, the control step is characterized by comprising a control signal transmission step in which to transmit a control signal containing an exclusive code and the selected operation mode of an electronic device which performs the first function set in the operation mode selected by the central control unit; a function performing step in which to analyze a control signal received from the terminal control unit of a corresponding electronic device and in which the electronic device performs a corresponding function of the operation mode; and an interoperation control signal transmission step in which to transmit a control signal containing an exclusive code and the selected operation mode of the electronic device performing the next function in the terminal control unit after the electronic device performs a corresponding function, and the electronic device performing the second function of the operation mode performs only the function performing step and the interoperation control signal transmission step.

Here, the interoperation control signal transmission step is characterized in that the operation mode from which the function performed by the current electronic device is removed is contained in a control signal and is transmitted to the terminal control unit of the electronic device which performs the next function.

Meanwhile, the operation mode setting step is characterized in that the central control unit transmits all the set operation modes to the terminal control unit of each electronic device, and the terminal control unit of each electronic unit receives it and stores in the second storing unit.

At this time, the control step is characterized by comprising a control signal transmission step in which to transmit a control signal containing the exclusive code and the code of the selected operation mode of the electronic device performing the first function set in the operation mode selected by the central control unit and the position information indicating the sequence of the to-be-performed function in the operation mode; a function performing step in which the terminal control unit of a corresponding electronic device analyzes the received control signal, and a corresponding operation mode is selected from the operation modes stored in the second storing unit, and the function performed in the selected operation mode is selected, and the electronic device performs a corresponding function; and an interoperation control signal transmission step in which the electronic device performs a corresponding function, and the terminal control unit transmits a control signal containing the exclusive code and the codes of the selected operation mode of the electronic device that the terminal control unit performs the next function and the position information of the function which will be performed in the next step, and the electronic device performing the second function of the operation mode performs only the function performing step and the interoperation control signal transmission step.

There is further provided feedback steps in which the terminal control unit transmits a function completion signal to the central control unit after the function performing steps.

Meanwhile, the operation mode is set by an external device and is transmitted to the central control unit or the operation mode is directly set by the central control unit.

Advantageous Effects

According to the present invention, there are provided a central control unit which transmits a control signal for controlling electronic devices and a plurality of electronic devices each equipped with a terminal control unit for receiving a signal from the central control unit, with which the user can sequentially control all the operations of the plurality of the electronic devices with the aid of one central control unit.

In addition, according to the present invention, a central control unit configured to control multiple electronic devices is equipped with a storing unit, and the storing unit stores an operation mode in which all functions or part of the functions performed by each electronic device are combined and conducted in a sequence that the user sets. When the user sets the operation mode performed by each device, the central control unit transmits the function, which is performed by each electronic device, to the terminal control unit installed at each electronic device in the set operation mode, and the multiple electronic devices automatically perform each function in accordance with the operation mode set by the user, so multiple electronic devices can be more easily controlled.

In addition, the present invention has features in that it is possible to control a conventional electronic device using a central control unit by installing only a terminal control unit at a conventional electronic device, and when each control unit performs a function based on an operation mode, and each function is completed, a completion signal is transmitted to the central control unit, so it is possible to check the current states of each device using the central control unit.

BEST MODES FOR CARRYING OUT THE INVENTION

Figure 1:
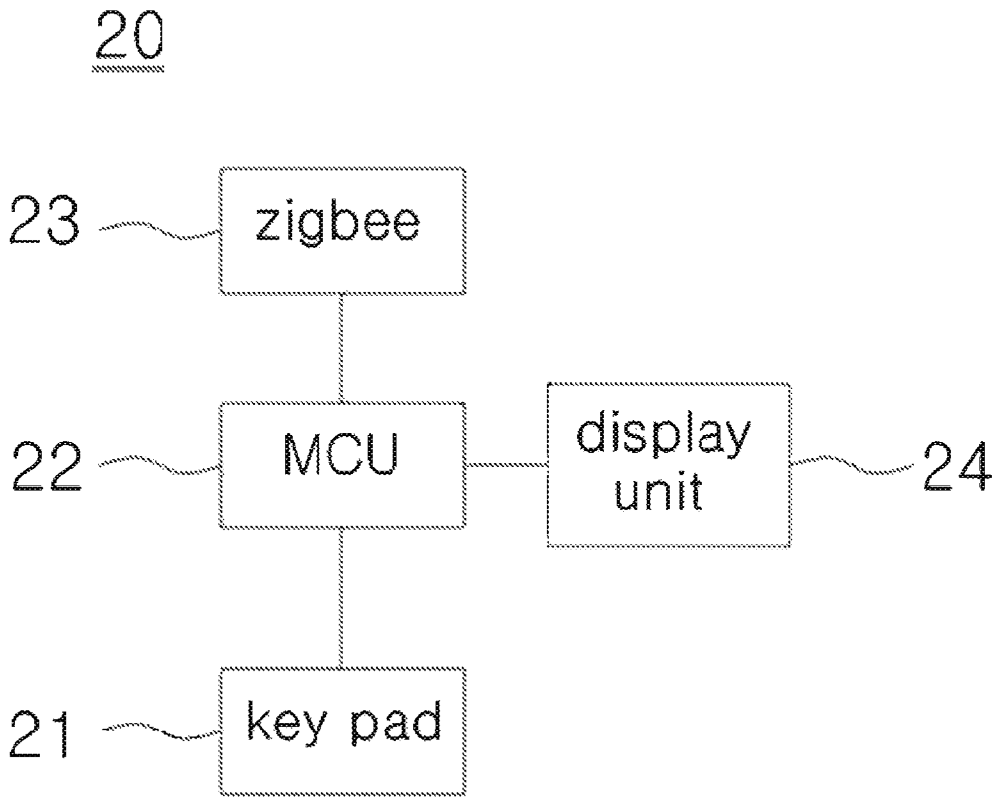
FIG. 1 is a block diagram illustrating a conventional control unit.
Figure 2:
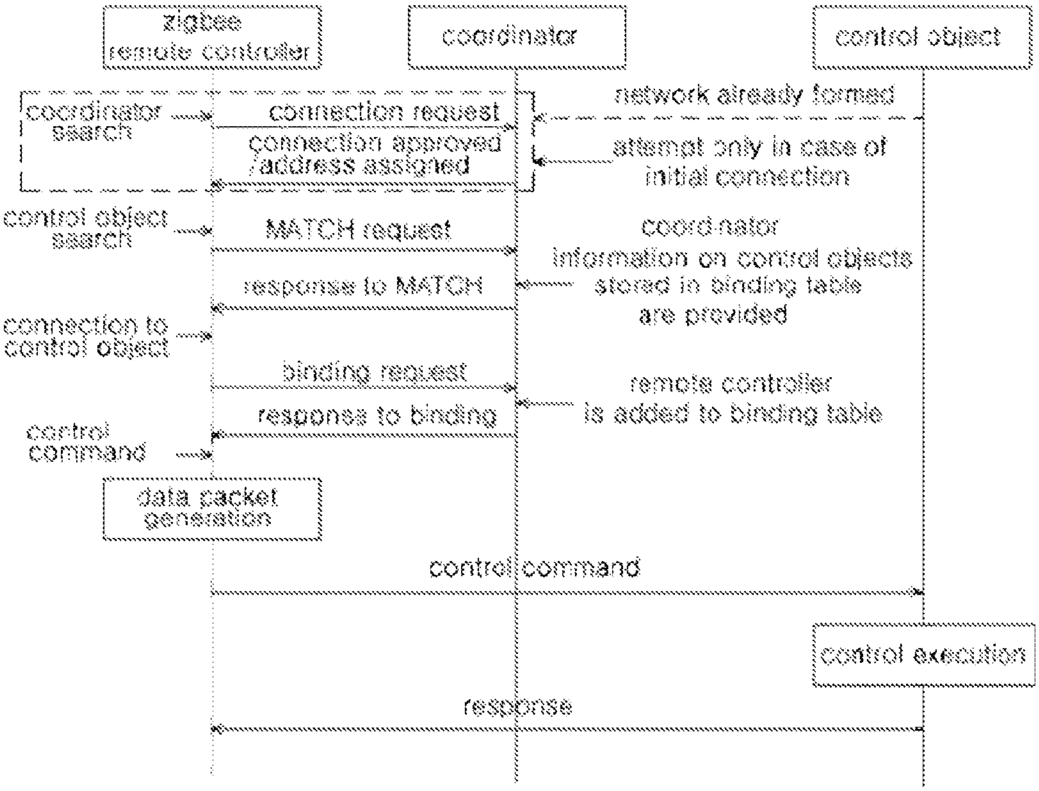
FIG. 2 is a flow chart of a conventional control unit.

The preferred embodiments of the present invention will be described with reference to the accompanying drawings. The same elements will be given the same reference numerals, and the descriptions on the same elements would not be repeated, and the present invention might be implemented in multiple modes and is not limited to the disclosed embodiments.

Figure 3:
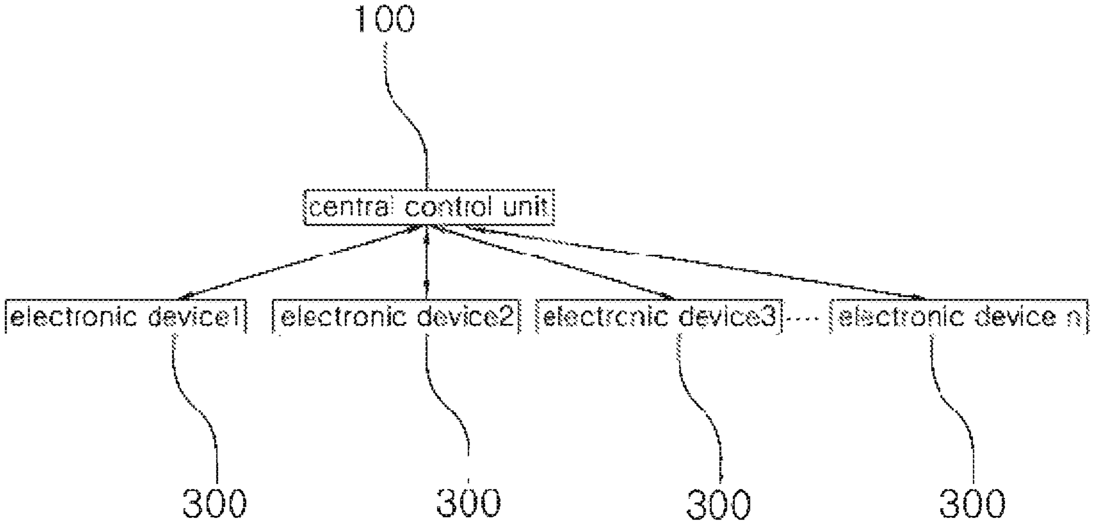
FIG. 3 is a view illustrating an automatic interoperation control method for multiple electronic devices according to the present invention.
Figure 4:
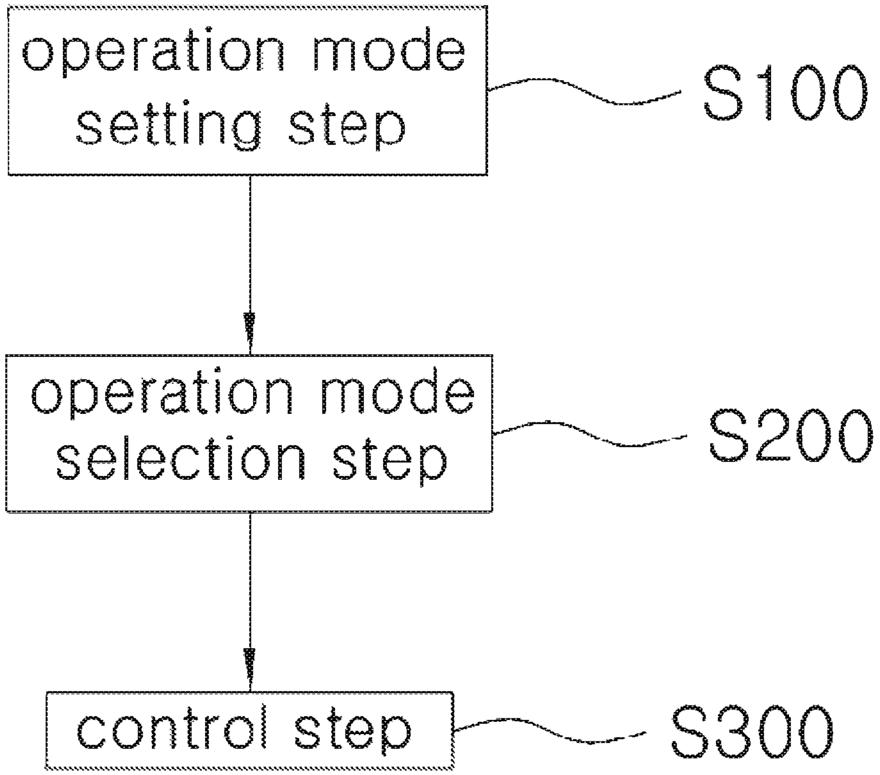
FIG. 4 is a flow chart illustrating an automatic interoperation control method for multiple electronic devices according to the present invention.
Figure 5:
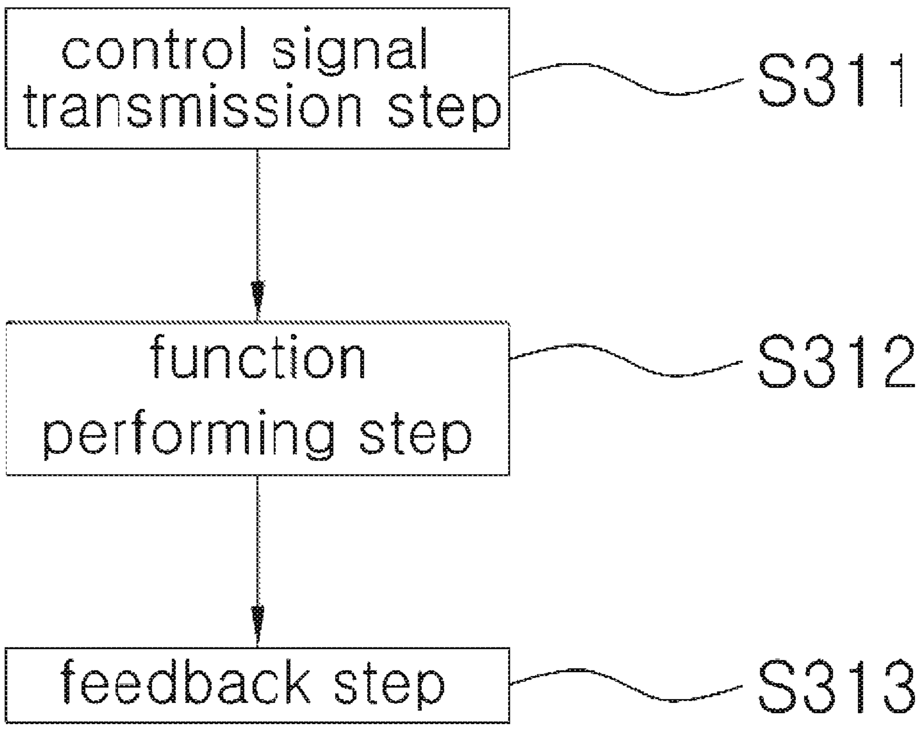
FIG. 5 is a block diagram illustrating an example of an apparatus for implementing an automatic interoperation control method for multiple devices.
Figure 6:
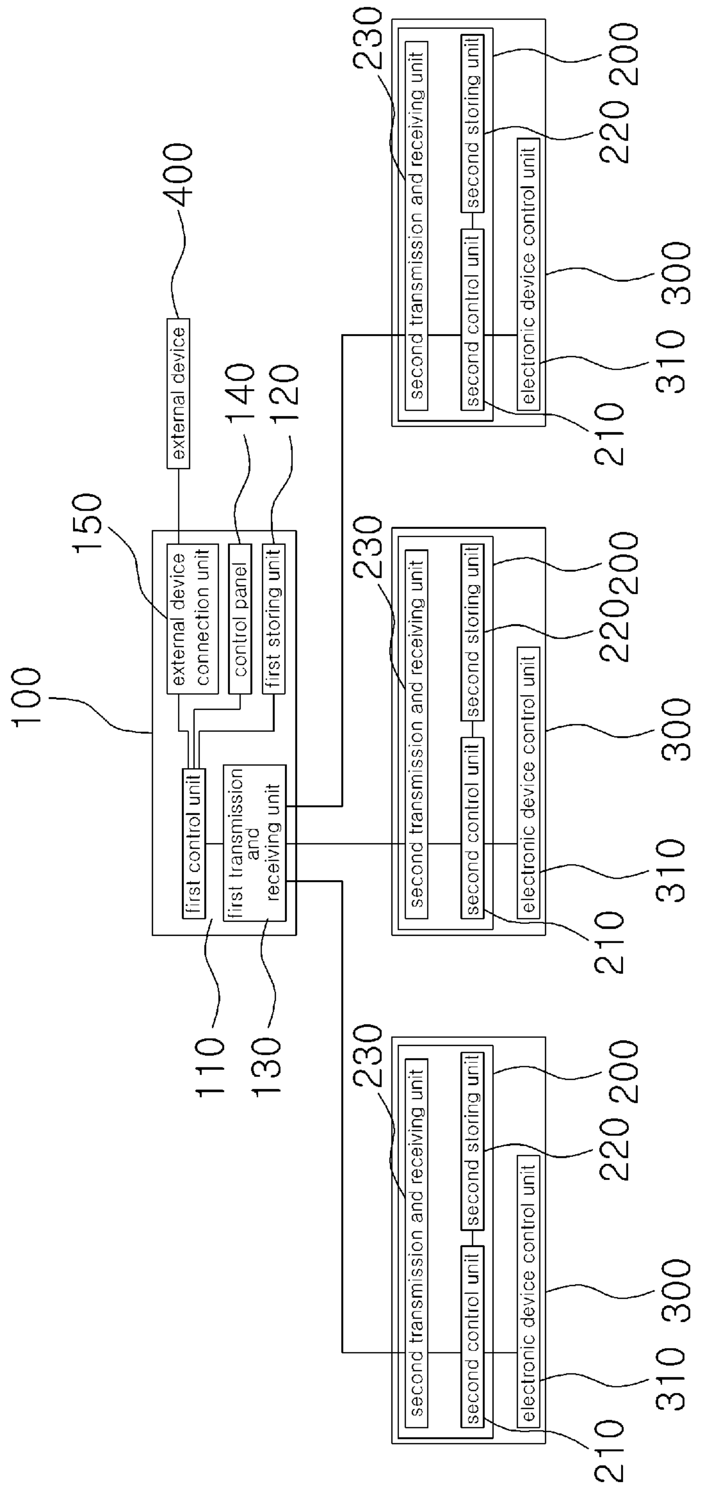
FIG. 6 is a flow chart illustrating a control step for an automatic interoperation control method for multiple devices according to the present invention.
Figure 7:
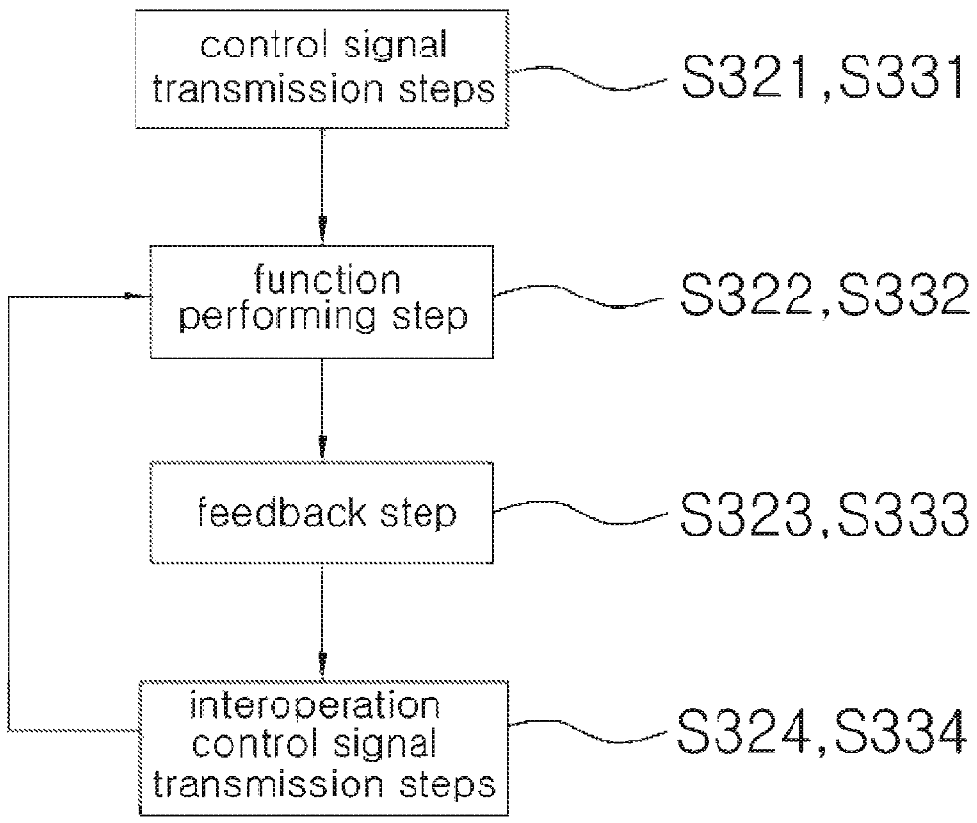
FIG. 7 is a flow chart illustrating a control process of an automatic interoperation control method for multiple devices according to the present invention.
Figure 8:
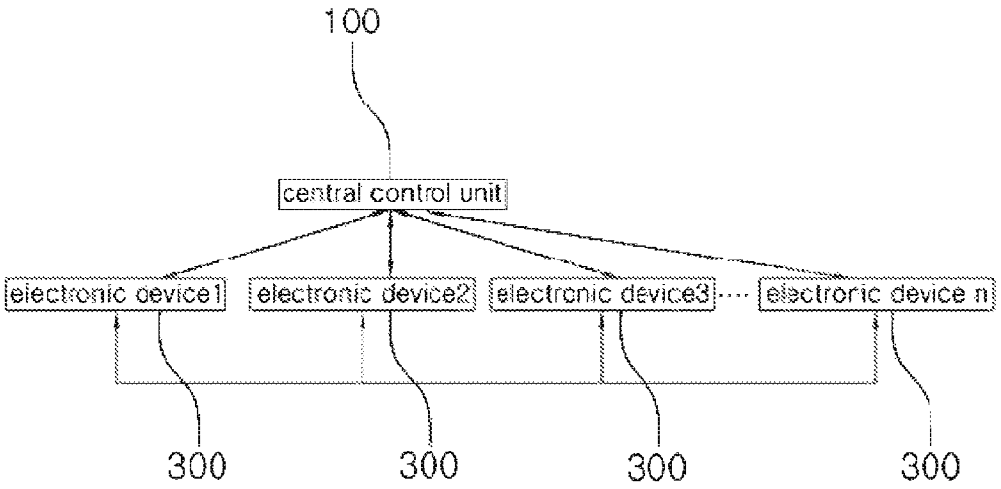
FIG. 8 is a conceptional view of FIG. 7.

FIG. 3 is a view illustrating an automatic interoperation control method for multiple electronic devices according to the present invention. FIG. 4 is a flow chart illustrating an automatic interoperation control method for multiple electronic devices according to the present invention. FIG. 5 is a block diagram illustrating an example of an apparatus for implementing an automatic interoperation control method for multiple devices. FIG. 6 is a flow chart illustrating a control step for an automatic interoperation control method for multiple devices according to the present invention. FIG. 7 is a flow chart illustrating a control process of an automatic interoperation control method for multiple devices according to the present invention. FIG. 8 is a conception view of FIG. 7.

The present invention is directed to an automatic interoperation control method for multiple devices which are capable of controlling multiple electronic devices 300 with the aid of a central control unit 100 and a terminal control unit 200 provided at each electronic device 300 (here, the electronic device is referred to all kinds of devices which can be electronically controlled). As shown in FIGS. 3 to 5, the automatic interoperation control method for multiple devices according to the present invention comprises an operation mode setting step S100 in which an operation mode configured by combining the functions performed by each electronic device 300 is set and stored in the central control unit 100, an operation mode selection step S200 in which an executable operation is selected among the set multiple operation modes, and a control step S300 in which each electronic device 300 is controlled in accordance with the selected operation mode.

The central control unit 100 comprises a first storing unit 120 for storing the functions and operation modes of each electronic device 300, a first transmission and receiving unit 130 for transmitting a control signal so as to control each electronic device 300, a first control unit 110 for generating a control signal in accordance with the data stored in the first storing unit 120, and a control panel 140 which is formed of an operation button (not shown) and a display unit (not shown) for performing the functions that a user wants to perform.

The terminal control unit 200 comprises a second transmission and receiving unit 230 which receives a control signal from the first transmission and receiving unit 130 of the central control unit 100, a second storing unit 220 which stores a control signal from the second transmission and receiving unit 230, and a second control unit 210 which performs the function of a corresponding device in accordance with a control signal.

At this time, the terminal control unit 200 may be integrally provided when manufacturing the electronic device 300 or may be attached to a conventional electronic device 300. The conventional electronic device 300 which sells in the markets can be used as it is connected to the central control unit 100 of the present invention.

As shown in FIG. 4, when the terminal control unit 200 is connected to the conventional electronic device 300 and is used, the electronic device control unit 310 can control the electronic device 300 in such a way that a control signal inputted from the second control unit 210 of the terminal control unit 200 is analyzed and transmitted to the electronic device control unit 310 provided at each electronic device 300 for performing a corresponding function.

When the terminal control unit 200 is integrally provided at the time of manufacturing the electronic device 300, the second control unit 210 of the terminal control unit 200 is designed to have the same function as the function of the electronic device control unit 310 of the electronic device 300 for the electronic device 300 to analyze the received control signal and directly control a corresponding function.

In addition, the central control unit 100 may be separately manufactured; however it might be used by installing a certain program such as an application in a device like a tablet PC such as an iPad or a Galaxy Tab or a device like a portable FDA which has a near field wireless communication function such as a blue tooth. A certain program might be installed in a device like a smart phone, a telephone, a computer, etc. which uses a distant wired or wireless communication function.

The operation mode set in the operation mode setting step S100 has functions which can be performed at each electronic device 300 (in case of the same devices, same functions are given, and in case of different devices, different functions are given). The user can combine such functions in a sequence that the user wants, so the set functions can be performed in a combined sequence.

At this time, the operation mode is stored in the first storing unit 120 provided in the interior of the central control unit 100. When the operation mode is set using an external device 400 such as a typical computer or a notebook computer. It can be transmitted to the first storing unit 120 through an external device connection unit 150 like a USB terminal of the central control unit 100 or it might be directly transmitted to the central control unit 100 using an operation button (not shown) and a display unit (not shown) which are provided in the central control unit 100.

In the operation mode selection step S200, one of multiple operation modes stored in the first storing unit 120 is selected. In the control step S300, each electronic device 300 is controlled in accordance with the operation mode selected in the control step S300.

The multiple electronic devices 300 and the central control unit 100 are connected each other in a wired connection way or a wireless connection way such as a blue tooth or a zigbee. The electronic device 300 and the central control unit 100 have exclusive codes with which they transmit signals to the devices.

For the wireless communication, when the central control unit 100 transmits a control signal containing an exclusive number through the first transmission and receiving unit 130, each electronic device 300 receives a control signal through the second transmission and receiving unit 230 of the terminal control unit 200. At this time, when an exclusive code contained in the control signal is not an exclusive code of a corresponding electronic device 300, the control signal is dismissed, and when it is an exclusive signal of a corresponding electronic device 300, the second control unit 210 analyzes the control signal and performs a corresponding function.

When setting the operation mode, an exclusive code of each electronic device 300 and a code corresponding to the function of the electronic device 300 are combined. For example, when three electronic devices 300 are connected to the central control unit 100, the excusive codes of each electronic device 300 is set as A, B and C, so there are three functions which can be performed by each electronic device 300. Since such codes are set as 1, 2 and 3, when setting the operation mode, they can be set as A3-B1-A2-C3 or C2-A2-A1-B3 or A1-C2-B2-B1. They can be set to have more functions.

The above example needs three electronic devices 300; however more electronic devices 300 may be employed, and each operation mode can be set to control all the electronic devices 300 or can be set to control specified electronic devices 300.

The operation mode is set to sequentially perform the functions of each electronic device 300. Here, the operation mode can be set to perform one function for the sake of each sequence or it can be set to perform the functions of the multiple electronic devices 300 for the sake of specified sequences or all sequences. When it is set to perform multiple functions at a time, the operation mode is added with a specific identification code.

For the functions set in the operation modes, each function may be performed with one start and one end, respectively. The function, which can be endlessly performed, is set to perform a function only for the time set with a time required to perform the function.

A specific type of protocol is used for each communication. Since the above mentioned protocol is well known to an engineer who works in a corresponding field, the specific descriptions thereon will be omitted.

In the control step S300, a control signal is transmitted to each electronic device 300 in accordance with a sequence set in the operation mode selected by the central control unit 100.

As shown in FIG. 6, the control step S300 comprises a control signal transmission step S311 in which to transmit a control signal containing an exclusive code and a to-be-performed function for the purpose of performing a corresponding function in accordance with a sequence set in the operation mode selected by the central control unit 100, a function performing step S312 in which to analyze a control signal received by the terminal control unit 200 of a corresponding electronic device 300, and a feedback step S313 in which to transmit a function performing completion signal to the central control unit 100 after the electronic device 300 performs a corresponding function.

At this time, the control signal is formed in the forms of A2, B3 and C2 by combining an exclusive code and a code of a to-be-performed function of each electronic device 300, and the central control unit 100 transmits a control signal through the first transmission and receiving unit 130, and only the terminal control unit 200 of a corresponding electronic device 300 receives a control signal based on an exclusive code contained in the control signal of the second transmission and receiving unit 230 of the terminal control unit 200 provided in each electronic device 300, and the second control unit 210 detects a code of a function contained in the control signal, so the electronic device 300 performs a corresponding function.

In the function performing step S312, when the terminal control unit 200 is integrally provided in the electronic device 300, the second control unit 210 is designed to directly control the electronic device 300, and when the terminal control unit 200 is installed in a typical electronic device 300, the second control unit 210 transmits a signal corresponding to a corresponding function to the electronic device control unit 310 provided in the electronic device 300, so the electronic device control unit 310 performs a corresponding function by controlling the electric device 300.

In the feedback step S313, when the electronic device 300 finishes the corresponding function, and when the terminal control unit 200 is integrally provided, the second control unit 210 transmits a function completion signal to the central control unit 100 through the second transmission and receiving unit 230, and when the terminal control unit 200 is separately provided, the second control unit 210 detects a function completion state using the electronic device control unit 310 of the electronic device 300 and transmits a function completion signal to the central control unit 100 through the second transmission and receiving unit 230.

The automatic interoperation control method for multiple devices according to another embodiment of the present invention comprises an operation mode setting mode S100 in which to set an operation mode and to store in the central control unit 100 so that the functions performed by each electronic device 300 can be combined and performed in a specific sequence, a selection step S200 in which to select the to-be-performed operation mode among the set multiple operation modes, and a control step S300 in which to control each electronic device 300 in accordance with the selected operation mode. As shown in FIG. 7, the control step S300 comprises a control signal transmission step S321 in which to transmit a control signal containing an exclusive code and the selected operation mode of the electronic device 300 performing the first function set in the operation mode selected by the central control unit 100, a function performing step S322 in which to analyze the control signal received from the terminal control unit 200 of the corresponding electronic device 300 and in which the electronic unit 200 performs a corresponding function of the operation mode, and an interoperation control signal transmission step S324 in which to transmit a control signal containing an exclusive code and the selected operation mode of the electronic device 300 which is supposed to perform the next functions in the terminal control unit 200 after a corresponding function is performed by the electronic device 300.

In the control signal transmission step S321, an exclusive code of the electronic device 300 which performs the first function in the selected operation mode is extracted, and the operation mode and the exclusive code are combined for thereby producing a control signal. For example, when the operation mode is formed of B2-C1-A2-A1, the exclusive code of the electronic device 300 which is supposed to perform the first function becomes "B", so the control signal is formed of "B"+operation mode (B2-C1-A2-A1), and the above control signal is transmitted in the forward direction from the first transmission and receiving unit 130 of the central control unit 100.

The second transmission and receiving unit 230 of the terminal control unit 200 provided in each electronic unit 300 receives the forwardly transmitted signal, and only in case of the exclusive number of a corresponding device, a control signal is received and transmitted to the second control unit 210 of the terminal control unit 200. The second control unit 210 analyzes the control signal and separates the exclusive code which was first assigned, and extracts the exclusive code "B" which is first positioned in the operation mode, and "2" corresponding to the function code 2 is extracted. When the corresponding device and the extracted exclusive code match with each other, the electronic device 300 performs the function corresponding "2" of the function code.

In the interoperation control signal transmission step S324, the exclusive code (corresponding to "C" in the above example) of the electronic device 300 which is supposed to perform the next function in the operation mode is extracted, and the exclusive mode and the operation mode of the electronic device 300 are combined for thereby producing a control signal. In the operation mode, the function to be performed by the current electronic device 300 is deleted for thereby performing the operation mode.

In the above mentioned embodiment of the present invention, the original operation mode was B2-C1-A2-A1; however "B2" corresponding to the function performed by a corresponding electronic device 300 (the exclusive code is "B") is deleted, and the operation mode is formed of C1-A2-A1, and "C" corresponding to the exclusive code of the electronic device 300 which performs the next function before the operation mode is combined, and a control signal is formed of C, C1-A2-A1 for thereby forwardly transmitting it through the second transmission and receiving unit 230.

The terminal control unit 200 of the next electronic device 300 (having the exclusive code "C") receives a control signal and sequentially performs the function performing step 322 and the interoperation control signal transmission step S324, and afterwards it performs the same operations until all the functions set in the operation modes are repeatedly performed.

After the function performing step S322 is performed, there is further provided a feedback step S323 in which the terminal control unit 200 detects that the electronic device 300 has completed the corresponding function, and a function completion signal is transmitted to the central control unit 100 through the second transmission and receiving unit 230.

The central control unit 100 displays the operation states of the current operation mode on a display unit (not shown), so the user can visually check the current proceeding states.

The remaining constructions are same, so the descriptions thereof will be omitted.

The automatic interoperation control method for multiple devices according to another embodiment of the present invention comprises an operation mode setting step S100 in which to set an operation mode by which the functions performed by each electronic device 300 are combined and performed in a certain sequence and in which to store the operation mode in the central control unit 100, an operation mode selection step S200 in which to select a to-be-performed operation among the set multiple operation modes, and a control step S300 in which to control each electronic device 300 in accordance with the selected operation mode. In the operation mode setting step S100, the central control unit 100 transmits all the set operation modes to the terminal control unit 200 of each electronic device 300, and the terminal control unit 200 of each electronic device receives all the operation modes and stores in the second storing unit 220.

As shown in FIG. 7, the control step S300 comprises a control signal transmission step S331 in which to transmit a control signal containing the exclusive code and the code of the selected operation mode of the electronic device 300 performing the first function set in the operation mode selected by the central control unit 100 and the position information indicating the sequence of the to-be-performed function in the operation mode, a function performing step S332 in which the terminal control unit 200 of a corresponding electronic device 300 analyzes the received control signal, and a corresponding operation mode is selected from the operation modes stored in the second storing unit 230, and the function performed in the selected operation mode is selected, and the electronic device 300 performs a corresponding function, and an interoperation control signal transmission step S334 in which the electronic device 300 performs a corresponding function, and the terminal control unit 200 transmits a control signal containing the exclusive code and the codes of the selected operation mode of the electronic device 300 that the terminal control unit 200 performs the next function and the position information of the function which will be performed in the next step.

When the selected operation mode is C2-B1-B2-A2, and the code of the operation mode is "15", since "C" of the exclusive code of the electronic device 300 which will perform the first function and "15" of the code of the operation mode and the first function in the operation mode are implemented, "1" corresponding to the position information is combined, and a control signal is formed of C, 15, 1, and the control signal is forwardly transmitted through the first transmission and receiving unit 130 of the central control unit 100.

The terminal control unit 200 provided in each electronic device 300 detects an exclusive code of the electronic device 300 which is contained in the control signal, and only the corresponding electronic device 300 receives a control signal, and the second control unit 210 analyzes the received control signal, and "15" of the code of the operation mode and "1" of the position information are extracted. In the operation mode stored in the second storing unit 220, the operation mode C2-B1-B2-A2 whose code is "15" is selected, and "2" of the function code of the device whose the exclusive code is "C" of the first function in the operation mode is extracted with reference to "1" which is the position information, and the corresponding electronic device 300 performs a function corresponding to "2" of the code.

In addition, after a corresponding function is performed, "B" of the exclusive code of the electronic device 300 which is supposed to perform the next function and "15" of the code of the operation mode and "2" of the position information of the next function are combined for thereby forming a control signal formed of B, 15, 2. A control signal is forwardly transmitted through the second transmission and receiving unit 230.

The electronic device connected after the electronic device 300 which performs the second function does not perform the control signal transmission step S331, but performs only the function performing step S332 and the interoperation control signal transmission step S334 until the functions of the operation modes are all performed.

After the function performing step S322 is performed, there is further provided a feedback step S323 in which the terminal control unit 200 detects whether the electronic device 300 completes a corresponding function, and a function completion signal is transmitted to the central control unit 100 through the second transmission and receiving unit 230.

The central control unit 100 displays the operation state of the current operation mode on a display unit (not shown), so the user can visually check the proceeding state.

Since the remaining constructions are same, the descriptions thereof will be omitted.

As the present invention may be embodied in several forms without departing from the spirit or essential characteristics thereof, it should also be understood that the above-described examples are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

INDUSTRIAL APPLICABILITY

The present invention relates to an automatic interoperation control method for multiple devices, and in particular to an automatic interoperation control method for multiple devices which makes it possible to easily control multiple electronic devices in accordance with a set operation mode by combining the functions of the multiple electronic devices with the aid of one central control unit, in more details, which makes it possible to control multiple devices to interoperate with one operation mode command set by the central control unit.

The invention claimed is:

1. An interoperation control method for multiple devices, the multiple devices comprising
   - a central control unit including
     - a first storing unit,
     - a first transmission and receiving unit,
     - a control panel, and
     - a first controller controlling the first storage unit, the first transmission and receiving unit and the control panel, and
   - a plurality of electronic devices, each of the electronic devices comprising
     - a second storing unit,
     - a second transmission and receiving unit communicating with the central control unit and other electronic devices,
     - a second controller controlling the second storing unit and the second transmission and receiving unit, the method comprising:
   - forming, in the central control unit, at least one set of operation modes, the set of operation modes including at least two operation modes to be performed in sequence in the electronic devices, each of the operation modes consisting of
     - an identification code designating one of the electronic devices, and
     - a function code designating a function to be performed in the one of the electronic devices designated by the identity code,
   - storing the set of operation modes in the first storing unit of the central control unit;
   - selecting, in the central control unit, the set of operation modes stored in the first storing unit;
   - transmitting, through the first transmission and receiving unit, the set of operation modes selected from the first storing unit to the electronic devices;
   - receiving, by a first electronic device through the second transmission and receiving unit, the set of operation modes transmitted from the central control unit, the first electronic device being designated by the identification code of a first operation mode of the set of operation modes;
   - performing, by the first electronic device, the function designated in the function code of the first operation mode of the set of operation modes;
   - forming, by the first electronic device, a modified set of operation modes by modifying the set of operation modes received from the central control unit;
   - transmitting, by the first electronic device through the second transmission and receiving unit, the modified set of operation modes to the electronic devices;
   - receiving, by a second electronic device, the modified set of operation modes transmitted from the first electronic device, the second electronic device being designated by the modified set of operation modes; and
   - performing, by the second electronic device, the function designated by the modified set of operation modes.

2. The method of claim 1, further comprising feeding back a function completion signal, from the electronic devices, to the central control unit when the electronic devices complete a corresponding function.

3. The method of claim 1, wherein the modified set of operation modes is formed by removing the first operation mode from the set of operation modes received from the central control unit.

4. An interoperation control method for multiple devices, the multiple devices comprising
   - a central control unit including
     - a first storing unit,
     - a first transmission and receiving unit,
     - a control panel, and
     - a first controller controlling the first storing unit, the first transmission and receiving unit and the control panel, and
   - a plurality of electronic devices, each of the electronic devices comprising
     - a second storing unit,
     - a second transmission and receiving unit communicating with the central control unit and other electronic devices,
     - a second controller controlling the second storing unit and the second transmission and receiving unit, the method comprising:
   - forming, in the central control unit, multiple sets of operation modes, each set of operation modes having a serial number and including at least two operation modes to be performed in sequence in the electronic devices, each of the operation modes consisting of
     - an identification code designating one of the electronic devices, and
     - a function code designating a function to be performed in the one of the electronic devices designated by the identification code,
   - storing the multiple sets of operation modes in the first storing unit of the central control unit;
   - transmitting, through the first transmission and receiving unit by the central control unit, the multiple sets of operation modes to the electronic devices;
   - receiving, by the electronic devices, the multiple sets of operation modes transmitted from the central control unit and storing the multiple sets of operation modes in the second storing unit of each of the electronic devices;
   - transmitting, through the first transmission and receiving unit by the central control unit, a first control signal to the electronic devices, the first control signal including
     - a first identification code designating a first electronic device to be performed,
     - a first serial number identifying a first set of operation modes to be performed, and
     - a first position information indicating a position of an operation mode which includes a first function code to be performed, within the first set of operation modes;
   - receiving, through the second transmission and receiving unit by the first electronic device, the first control signal transmitted from the central control unit;
   - retrieving, by the first electronic device, the first set of operation modes from the second storing unit with referring the first serial number;
   - identifying, by the first electronic device, the first function to be performed from the first set of operation modes retrieved from the second storing unit with referring the first position information;
   - performing, by the first electronic device, the first function corresponding to the first position information;
   - transmitting, by the first electronic device, a second control signal to the electronic devices, the second control signal including
     - a second identification code designating a second electronic device to be performed,
     - the first serial number, and
     - a second position information indicating a position of an operation mode which includes a second function code to be performed, within the first set of operation modes;

receiving, by the second electronic device, the second control signal transmitted from the first electronic device;

retrieving, by the second electronic device, the first set of operation modes from the second storing unit with referring the first serial number;

identifying, by the second electronic device, the second function to be performed from the first set of operation modes retrieved from the second storing unit with referring the second position information; and performing, by the second electronic device, the second function corresponding to the second position information.

5. The method of claim 1, wherein the set of operation modes is set by an external device and is transmitted to the central control unit.

6. The method of claim 4, further comprising:

feeding back a function completion signal from the electronic devices to the central control unit when the electronic devices complete a corresponding function.

* * * * *